US006776817B2

(12) United States Patent
Lentz et al.

(10) Patent No.: US 6,776,817 B2
(45) Date of Patent: Aug. 17, 2004

(54) AIRFLOW SENSOR, SYSTEM AND METHOD FOR DETECTING AIRFLOW WITHIN AN AIR HANDLING SYSTEM

(75) Inventors: Tracy L. Lentz, Minnetonka, MN (US); Jeffrey M. Hammer, Maple Plain, MN (US); Mark E. Stout, Plymouth, MN (US); Leisha J. Rotering, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 212 days.

(21) Appl. No.: 09/995,066

(22) Filed: Nov. 26, 2001

(65) Prior Publication Data

US 2003/0097875 A1 May 29, 2003

(51) Int. Cl.[7] ................................................. G01F 1/68
(52) U.S. Cl. .................................................. 75/204.26
(58) Field of Search .................. 73/204.11, 204.22, 73/204.25, 204.26, 204.27, 204.18, 204.17; 165/11.1; 62/78; 374/40, 43, 44; 365/556, 557; 702/136, 137, 127

(56) References Cited

U.S. PATENT DOCUMENTS

| 3,931,736 | A | * | 1/1976 | Olmstead ................. 73/204.19 |
| 3,942,378 | A | * | 3/1976 | Olmstead ................. 73/204.16 |
| 4,876,887 | A | * | 10/1989 | Mickler .................... 73/204.11 |
| 4,914,742 | A | | 4/1990 | Higashi et al. |
| 4,981,035 | A | | 1/1991 | Hall |
| 5,107,687 | A | | 4/1992 | Candeloro |
| 5,200,156 | A | | 4/1993 | Wedekamp |
| 5,225,167 | A | | 7/1993 | Wetzel |
| 5,601,619 | A | | 2/1997 | Drechsler |
| 5,635,133 | A | | 6/1997 | Glazman |
| 5,688,308 | A | | 11/1997 | Voigts |
| 5,708,205 | A | | 1/1998 | Yamada et al. |
| 5,742,063 | A | | 4/1998 | Scroggins et al. |

(List continued on next page.)

FOREIGN PATENT DOCUMENTS

| DE | 8626547 | 1/1987 |
| DE | 19941330 | 10/2000 |
| WO | WO97/21986 | 6/1997 |

OTHER PUBLICATIONS

Honeywell Brochure, "Comfort, Energy & Health Solutions," ©Honeywell 2001.
Owner's Guide, "Enviracaire Elite—UV100E Ultraviolet Air Treatment System," 8 pgs, ©Honeywell 2001.
IBM Corp., IBM Technical Disclosure Bulletin entitled "Robust, Low–Cost, and Highly Sensitive Means to Detect Presence of Air Flow and Direction"; pp. 5–6, vol. 39, No. 1, 1996.
A copy of PCT International Search Report mailed on Jul. 4, 2003 (9 pages).

*Primary Examiner*—Harshad Patel (57) ABSTRACT

An airflow sensor including a housing, a flexible substrate, and electrical components. The housing defines an internal compartment and a top face opening. The substrate includes circuitry traces, and defines a front and a back. The substrate is disposed within the compartment such that the back is exposed relative to the opening. The electrical components are electrically connected to the circuitry traces, extending from the front of the substrate opposite the opening, and include a heated temperature sensor spaced from a baseline temperature sensor. During use, airflow interfaces with the substrate back to cool the heated temperature sensor. The extent of this cooling as compared to the baseline temperature sensor is indicative of airflow. The system and method include detecting the presence or absence of airflow based upon a temperature differential between the temperature sensors as well as a rate of change in the temperature differential.

46 Claims, 7 Drawing Sheets

U.S. PATENT DOCUMENTS

| | | | |
|---|---|---|---|
| 5,755,103 A | 5/1998 | Na et al. | |
| 5,935,525 A | 8/1999 | Lincoln et al. | |
| 5,968,455 A | 10/1999 | Brickley | |
| 6,019,505 A * | 2/2000 | Bonne et al. | 374/40 |
| 6,022,511 A | 2/2000 | Matschke | |
| 6,063,170 A | 5/2000 | Deibert | |
| 6,169,965 B1 * | 1/2001 | Kubisiak et al. | 702/136 |
| 6,234,016 B1 * | 5/2001 | Bonne et al. | 73/204.26 |
| 6,234,241 B1 * | 5/2001 | Elmore | 165/122 |
| 6,245,131 B1 | 6/2001 | Rippelmeyer et al. | |
| 6,264,802 B1 | 7/2001 | Kamrukov et al. | |
| 6,280,686 B1 | 8/2001 | Scheir et al. | |
| 6,502,459 B1 * | 1/2003 | Bonne et al. | 73/170.11 |
| 6,550,325 B1 * | 4/2003 | Inushima et al. | 73/204.26 |

* cited by examiner

AIRFLOW SENSOR, SYSTEM AND METHOD FOR DETECTING AIRFLOW WITHIN AN AIR HANDLING SYSTEM

BACKGROUND OF THE INVENTION

The present invention relates to an airflow sensor. More particularly, it relates to an airflow sensor, and associated system and method, for detecting the presence of airflow within an air handling system.

Most air handling systems (e.g., HVAC systems) include one or more components that are controlled as a function of environmental and/or operational parameters. For example, an air conditioner associated with a residential air handling system is commonly activated/deactivated by a thermostat that compares sensed air temperature with a pre-set value. More complex air handling systems employ computer-based, universal environmental control units to integrate and control a number of different components based upon a variety of sensed and operational parameters. To this end, while computer-based control has heretofore been limited to commercial applications, the advent of low-cost microprocessors has made these types of universal control units highly viable for residential platforms.

Regardless of the exact application platform, the presence or absence of forced airflow within the air handling system is a useful parameter utilized in controlling air handling system components, either on an individual basis or as part of a universal control unit. In general terms, most air handling systems include one or more fan/blowers that, when activated, circulate air throughout the living area or occupational environment. The circulating air leaves the fan/blower from a supply side and returns from the controlled space via a return air duct that may draw outdoor air into the home or building via a fresh air intake. The air is then subjected to heating or cooling conditioning (e.g., via a furnace, air conditioner, etc.), and then forced through auxiliary ductwork back to the rooms or offices. Thus, operation of the fan/blower (or similar device) results in the presence or absence of forced airflow within the air handling system. As a result, certain system components that are otherwise controlled as a function of whether airflow is present and/or operation of the fan/blower can utilize airflow detection information to effectuate proper control.

An example of an air handling system component that is preferably operated based upon airflow is an ultraviolet air treatment device positioned to treat air in the return duct. In general terms, ultraviolet air treatment devices include one or more appropriately sized ultraviolet lamps that are positioned within the air handling system's ductwork. The ultraviolet lamp is normally mercury-based, with the ultraviolet air treatment device including a power supply ballast used to energize the mercury. For residential applications, the ultraviolet air treatment device is mounted to the return air duct, with the lamp(s) protruding inside of the duct itself. During use, the ultraviolet lamp emits ultraviolet energy that destroys unwanted airborne microorganisms otherwise entrained in the airflow. As such, the ultraviolet lamp is most optimally operated when airflow is present, and is deactivated during periods of no airflow to save energy and increase the useful life of the ultraviolet lamp. Other air handling system components, such as air cleaners, humidifiers, etc., are similarly operated based upon the presence or absence of airflow.

One available technique for providing airflow-related information is to wire or electrically connect the particular component and/or universal control unit to the fan/blower, such as with a current sensing relay. This approach is relatively expensive, and is characterized by low reliability and installation complexities. Conversely, available airflow sensors can be located within the air handling system ductwork (such as the return air duct). In general terms, these airflow sensors typically incorporate two temperature sensitive elements (e.g., thermistor, RTD, etc.) and a heating element. During use, one of the temperature sensitive elements is heated by the heating element, while the other is not. Airflow cools the heated temperature sensor, providing a general indication of the presence of airflow.

The above-described airflow sensors are often times formed by potting the requisite elements in a well that is then mounted to protrude into the airflow. Alternatively, the sensor elements are mounted to a circuit board. A housing surrounds the circuit board and mounted components, and includes several small holes or slots that otherwise allow air to interact with at least the heated temperature sensor. Unfortunately, these available airflow sensors are relatively large, and thus present certain installation concerns. Further problems may arise with the potted sensor as this form of packaging causes an associated lag time in the sensing elements that may be too long for acceptable air handling system equipment control. An additional concern common to both forms of sensors is that debris (e.g., dirt, lint, etc.) entrained in the airflow will readily collect on the temperature sensor well or within the holes or slots in the housing, leading to the airflow sensor detection errors/failures. The currently available airflow sensor design is unable to eliminate the debris accumulation problem from a structural standpoint on a cost effective basis or correct for this potential error through programming efforts. Additionally, these sensors are susceptible to errors due to part tolerance deviations, temperature gradients and power supply voltage variations.

The presence or absence of airflow is an important parameter relied upon for optimal operation of certain air handling system components. Unfortunately, currently available techniques, including directly linking to the fan/blower motor or employing a known airflow sensor, are unsatisfactory from both a reliability and cost standpoint. Therefore, a need exists for a low cost airflow sensor that overcomes the debris accumulation issues experienced with current designs, as well as a related system and method for accurately interpreting signals from the airflow sensor to thus detect the presence or absence of airflow.

SUMMARY OF THE INVENTION

One aspect of the present invention relates to an airflow sensor for detecting airflow within an air handling system. The airflow system includes a housing, a flexible substrate, and electrical components. The housing defines an internal compartment and a top face. The top face forms an opening into the internal compartment. The flexible substrate includes circuitry traces, and defines a front and a back. In this regard, the substrate is disposed within the compartment such that the back is exposed relative to the opening in the top face. Finally, the electrical components are electrically connected to the circuitry traces and are positioned to extend from the front of the substrate. In other words, upon final assembly, the electrical components extend opposite the opening in the top face of the housing. In one preferred embodiment, the electrical components are embedded into insulating material contained within the housing. Regardless, the electrical components include a first, heated temperature sensor and a second, baseline temperature sensor. The first and second temperature sensors are spaced from one another along the substrate. With this construction, and during use, airflow interfaces with the back of the substrate to cool the first, heated temperature sensor. The extent of this cooling as compared to the second, baseline temperature sensor indicates the presence of airflow. In this regard, the airflow sensor is configured to limit the accumulation of debris along the back of the substrate, thereby minimizing the opportunity for sensor failure. In one preferred embodiment, the temperature sensors are thermistors, and an additional heating element, such as a resistor, is positioned in close proximity to the first temperature sensor to effectuate heating thereof. In a further preferred embodiment, the flexible substrate is a Kapton flexible circuit that is highly smooth, thereby preventing accumulation of debris.

Another aspect of the present invention relates to an airflow sensor system for detecting airflow within an air handling system. The sensor system includes an airflow sensor and a processor. The airflow sensor includes a first, heated temperature sensor and a second, baseline temperature sensor. The processor is electrically connected to the temperature sensors and is adapted to monitor signals therefrom. Further, the processor is adapted to determine current temperatures at the temperature sensors based upon the monitored signals, as well as to compare the determined current temperatures. Finally, the processor is adapted to determine an airflow state within the air handling system based upon the comparison and a rate of change in the difference between the current temperature. In one preferred embodiment, the system incorporates a first order lag filter routine to account for the affects of part tolerances, temperature gradients, and power supply voltage variations. In particular, a lag filter temperature differential (DTLag) that is then compared to the instantaneous value between the heated and unheated sensors (DT), resulting in a temperature rate of change value (DDT). The processor is further adapted to compare the DDT value with one or more predetermined threshold values, and then designate whether airflow is present or absent based upon the comparison. In one preferred embodiment, the processor is adapted to store different threshold values for evaluating whether airflow is on versus whether airflow is off. Finally, in another preferred embodiment, the processor is adapted to utilize a reference variable to confirm the airflow designation evaluation. In this regard, the processor is preferably further adapted to update the reference variable with a current reading upon determining that the air handling system has transitioned from an airflow off state to an airflow on state.

Yet another aspect of the present invention relates to a method for detecting airflow within an air handling system including ductwork. The method includes positioning an airflow sensor within the ductwork. In this regard, the airflow sensor includes a first, heated temperature sensor and a second, baseline temperature sensor. Signals from the temperature sensors are monitored. Based upon these monitored signals, current temperature readings for both of the temperature sensors are determined. Finally, an airflow state within the air handling system is determined based upon a difference between the determined current temperature readings (DT) and a rate of change in DT. In one preferred embodiment, the method includes generating a temperature rate of change value (DDT) based upon a difference between DT and a lag temperature differential value with the lag temperature differential value being generated as a function of DT and a sensor lag parameter. With this one preferred embodiment, the temperature rate of change value is compared with at least one threshold value for determining the presence of airflow. In an even more preferred embodiment, the temperature rate of change value is compared with a first threshold value to determine if airflow is not present, and compared with a second threshold value to determine if airflow is present. In an even more preferred embodiment, the step of determining the presence of airflow further includes comparing the difference between current temperature readings (DT) with a reference parameter that is updated from time-to-time with a current value upon determining that the air handling system has transitioned from an airflow off state to an airflow on state. In another preferred embodiment, the method further includes signaling the determined airflow state to an ultraviolet air treatment device.

DESCRIPTION OF THE PREFERRED EMBODIMENTS

Figure 1:
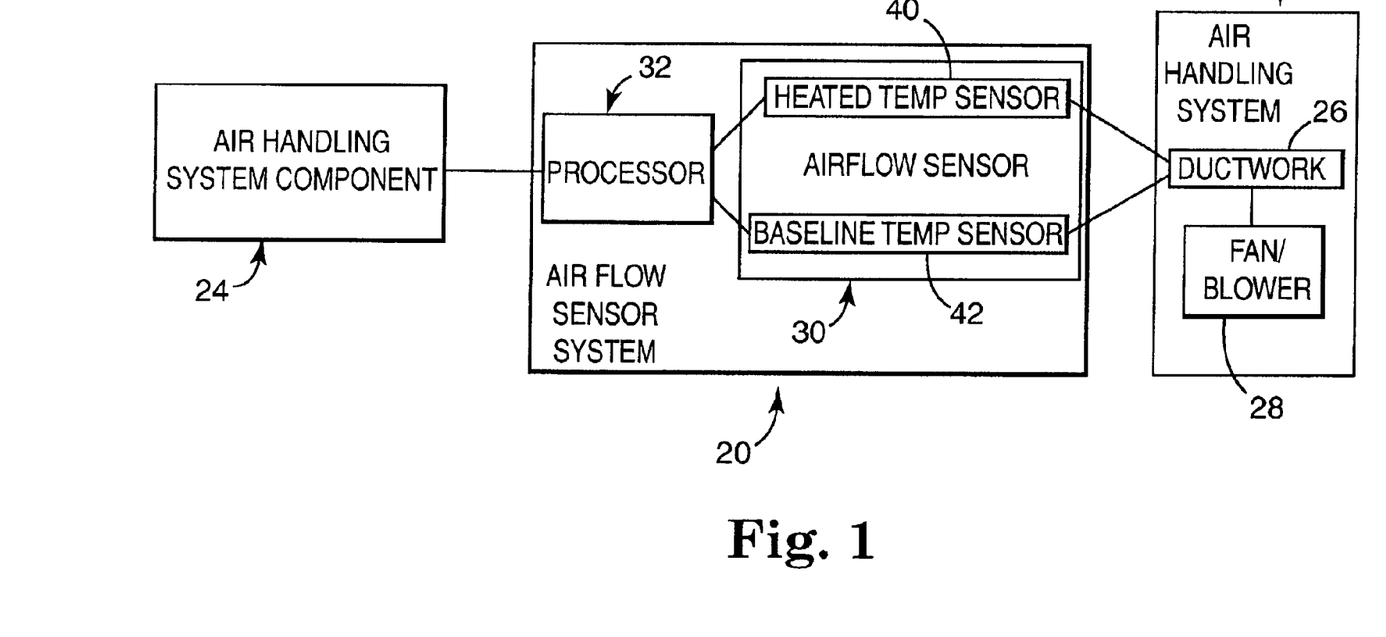
FIG. 1 is a block diagram illustrating an airflow sensor and related system in accordance with the present invention, in conjunction with an air handling system and an air handling system component.

One preferred embodiment of an airflow sensor system 20 is shown in block form in FIG. 1, in conjunction with an air handling system 22 and an air handling system component 24. As a point of reference, the air handling system 22 can assume a wide variety of forms appropriate for a particular residential, commercial, or industrial application. Thus, the air handling system 22 can include a wide variety of air handling components (one of which is referenced generally at 24), such as heating systems (e.g., furnace, heat pump, electric heat, etc.), cooling systems (e.g., air conditioner, swamp cooler, etc.), humidifiers, filters, ultraviolet air treatment devices, etc. Further, the air handling system 22 can be constructed to direct conditioned air (e.g., heated, cooled, and/or filtered) to a number of separate rooms or offices, or can be installed to a single room or office. Regardless, the air handling system 22 includes ductwork (referenced generally at 26) through which air is directed. For example, the ductwork 26 can include a return air duct, a supply duct, auxiliary ducts, etc. Thus, the ductwork 26 referenced in FIG. 1 reflects one or more of these ducts through which air flows. In this regard, the air handling system 22 includes a fan/blower 28 (or similar device) that, when activated, forces air through the ductwork 26.

As described in greater detail below, the airflow sensor system 20 is adapted to detect the presence of airflow within the ductwork 26 without requiring a direct electrical connection to the fan/blower 28. Information provided by the airflow sensor system 20 is then utilized to control operation (e.g., activation or deactivation) of the air handling system component 24. For example, the air handling system component 24 can be an ultraviolet air treatment device, an example of which is available under the tradename "Enviracaire Elite UV100E Ultraviolet Air Treatment System" from Honeywell Inc., of Golden Valley, Minn. Alternatively, the air handling system component 24 can include a number of other devices such as an electrostatic air cleaner, a universal environmental control unit, etc.

With the above in mind, the airflow sensor system 20 includes an airflow sensor 30 and a processor 32. Details on the various components are provided below. In general terms, however, the airflow sensor 30 includes a first, heated temperature sensor 40 and a second, baseline temperature sensor 42. The first and second temperature sensors 40, 42 are electrically connected to the processor 32, and are physically positioned within the ductwork 26. During use, the processor 32 interprets signals generated by the first and second temperature sensors 40, 42, and then determines whether forced airflow is occurring within the air handling system 22. This determination, in turn, is provided to the air handling system component 24 for subsequent operation thereof. Notably, while the airflow sensor system 20 is shown as being separate from the air handling system component 24, the two components can be combined. That is to say, the processor 32 can be housed within the air handling system component 24, and used to directly control operation of the component 24. Additionally, the first and second temperature sensors 40, 42 can be directly connected to a housing associated with the air handling system component 24. Thus, for example, where the air handling system component 24 is an ultraviolet air treatment device, the airflow sensor 30 can be formed as an extension of the ultraviolet air treatment device's housing, and the processor 32 used to not only interpret signals from the airflow sensor 30, but also to control activation/deactivation of an ultraviolet lamp associated with the component 24.

Figure 2:
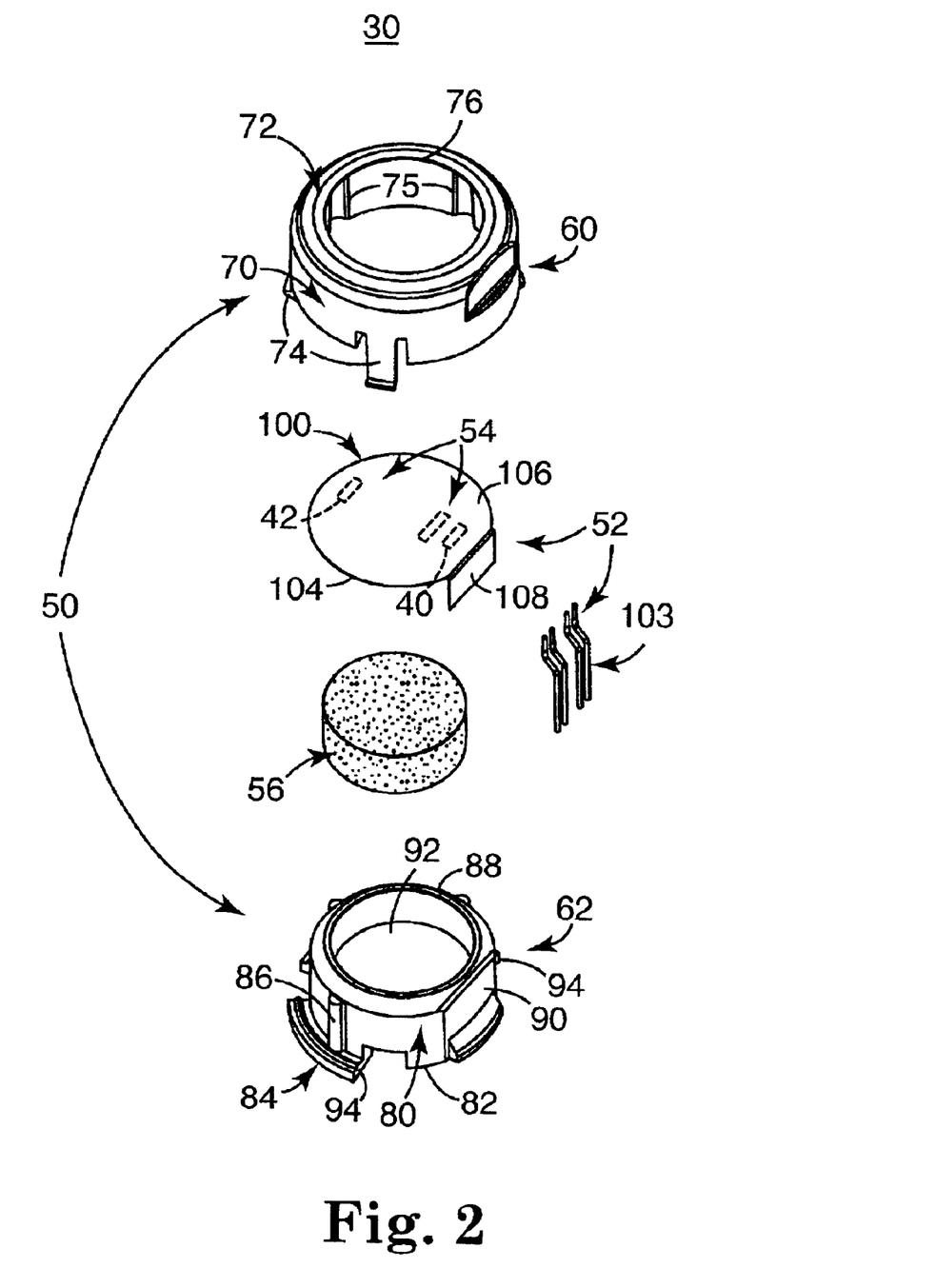
FIG. 2 is an exploded, perspective view of a preferred embodiment of the airflow sensor of FIG. 1.

One preferred embodiment of the airflow sensor 30 is shown in FIG. 2. The airflow sensor 30 preferably includes a housing 50, a circuitry assembly 52, electrical components 54 (referenced generally and with dashed lines as the electrical components are otherwise hidden in the view of FIG. 2), and insulating material 56. As described in greater detail below, the electrical components 54 (which include the first and second temperature sensors 40, 42) are mounted to the circuitry assembly 52. The housing 50, in turn, maintains the circuitry assembly 52 (and thus the electrical components 54), as well as the insulation material 56. During use, the airflow sensor 30 is mounted within the ductwork 26 (FIG. 1). When present, airflow interfaces with the circuitry assembly 52, and thus, the first, heated temperature sensor 40. As previously described, the processor 32 (FIG. 1) interprets signals from the first and second temperature sensors 40, 42, and determines whether or not airflow is present based upon these signals.

The housing 50 preferably includes an upper (or outer) section 60 and a lower (or inner) section 62. In a preferred embodiment, the upper section 60 serves as a cover, whereas the lower section 62 is a base. The sections 60, 62 are preferably formed of a rigid, non-conductive polymeric material such as polycarbonate, and are configured for mounting to one another. In this regard, a variety of techniques can be employed to effectuate fastening of the upper and lower sections 60, 62, such as ultrasonic weld, adhesive, screws, etc.

In a preferred embodiment, the upper section 60 includes a sidewall 70, a lip 72, and a plurality of legs 74. The sidewall 70 is preferably sized to be received over the lower section 62, and preferably forms one or more interior longitudinal slots 75 (one of which is shown in FIG. 2) sized to receive a corresponding portion of the lower section 62 as described below. The plurality of legs 74 extend from the sidewall 70 opposite the lip 72, and are preferably configured for attachment to the air handling system component 24 (FIG. 1). That is to say, in accordance with one preferred embodiment, the airflow sensor 30, and in particular the legs 74, is adapted to snap-fit into an appropriate receptacle associated with the component 24. Preferably, three of the legs 74 are provided, although any other number is also acceptable. Alternatively, where attachment to the separate component 24 is not required, the legs 74 can be eliminated.

The lip 72 defines a top face (relative to the orientation of FIG. 2) of the housing 50, extending in a radially inwardly fashion from the sidewall 70. Further, the lip 72 defines an opening 76. In a preferred embodiment, the opening 76 is circular, having a diameter in the range of approximately 0.5–1.0 inch, more preferably approximately 0.875 inch. As a point of reference, the sidewall 70 is also preferably circular in transverse cross-section, having an outer diameter in the range of 1–1.4 inches, more preferably 1.2 inches. Alternatively, other shapes and dimensions are acceptable. Regardless, the opening 76 is provided to allow airflow interaction with the circuitry assembly 52 as described in greater detail below.

The lower section 62 of the housing 50 includes a sidewall 80, a bottom 82, a flange 84, and a plurality of longitudinal ridges 86. The sidewall 80 extends from the flange 84, terminating in a leading edge 88. Further, in one preferred embodiment, an exterior of the sidewall 80 forms a flattened guide surface 90 for receiving a portion of the circuitry assembly 52 as described below. The sidewall 80 and the bottom 82 combine to define an internal compartment 92 (referenced generally in FIG. 2).

The flange 84 extends radially outwardly from the bottom 82 and forms apertures 94 (referenced generally in FIG. 2) sized to allow passage of the respective legs 74. Thus, the apertures 94 are sized and spaced to correspond with the legs 74. In one preferred embodiment, the apertures 94 are not equidistantly spaced relative to one another (the legs 74 are similarly arranged), such that a specific orientation of the upper and lower sections 60, 62 is required for assembling the housing 50. Further, the location of the guide surface 90, and thus an orientation of the electrical components 54, relative to the legs 74 is also known. With this preferred design, then, the airflow sensor 30 is mounted to the ductwork 26 (FIG. 1) or component 24 (FIG. 1) via the legs 74, the electrical components 54 will be positioned at a known, desired orientation. Finally, the flange 84 provides a flat bottom surface for mounting of the airflow sensor 30 to/within ductwork (such as the ductwork 26 of FIG. 1).

The longitudinal ridges 86 are spaced along the sidewall 80, and are provided to mate within the corresponding slots 75 formed in the sidewall 70 of the upper section 60. In a preferred embodiment, the ridges 86 are not equidistantly spaced from one another, again dictating a desired orientation of the sections 60, 62, and thus of the electrical components 54, upon final assembly.

Figure 3:
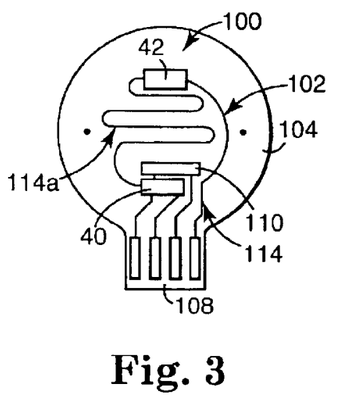
FIG. 3 is a front view of a substrate portion of the airflow sensor of FIG. 2 including mounted electrical components.
Figure 4:
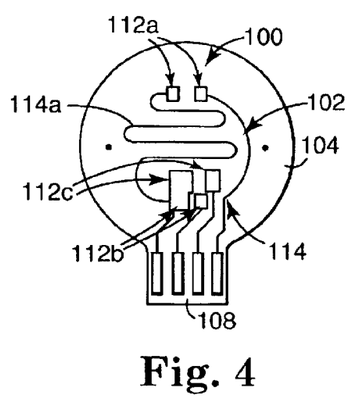
FIG. 4 is the substrate of FIG. 3 with the electrical components removed.

With additional reference to FIGS. 3 and 4, the circuitry assembly 52 includes a flexible substrate 100, onto which circuitry 102 is formed, and wiring 103. As a point of reference, FIG. 3 depicts the substrate 100 in conjunction with the electrical components 54, whereas the electrical components 54 have been removed from the view of FIG. 4.

The substrate 100 defines a front 104 (shown in FIGS. 3 and 4) and a back 106, and includes a trailing section 108. The electrical components 54 (described in greater detail below) are electrically connected to the circuitry 102 at the front 104. Conversely, upon final assembly, the flexible substrate 100 is arranged such that the back 106 is facing the opening 76 formed by the upper section 60 of the housing 50. Thus, the back 106 is exposed through the opening 76 to airflow. In this regard, the substrate 100 is highly smooth, preferably a Kapton flexible circuit as is known in the art and available, for example, from DuPont, preferably having a thickness of approximately 0.05 mil. The preferred material renders the flexible substrate 100, and in particular the back 106, highly smooth with a low coefficient of friction, so that debris will not readily adhere thereto. Further, the thin nature renders the substrate 100 highly flexible.

The electrical components 54 preferably include the first temperature sensor 40, the second temperature sensor 42 and a heating element 110. More preferably, the first and second temperature sensors 40, 42 are thermistors, whereas the heating element 110 is a resistor. With this in mind, and with specific reference to FIG. 4, the circuitry 102 includes mounting pad sets 112a, 112b, 112c, and circuitry traces 114. The first mounting pad set 112a is configured to electrically receive the second temperature sensor 42; the second mounting pad set 112b is configured to electrically receive the first temperature sensor 40; and the third mounting pad set 112c is configured to electrically receive the heating element 110. Finally, the circuitry traces 114 includes a circuitry trace 114a that electrically connects the mounting pad sets 112a, 112b (and thus electrically connects the temperature sensors 40, 42) in series.

In a preferred embodiment, the third mounting pad set 112c is positioned in close proximity to the second mounting pad set 112b. As a result, the heating element 110 is positioned in close proximity to the first temperature sensor 40, such that the heating element 110 can heat the first temperature sensor 40. Conversely, the first mounting pad set 112a is spaced from the second and third mounting pad sets 112b, 112c, such that the second temperature sensor 42 is spaced from the first temperature sensor 40 and the heating element 110. In a preferred embodiment, the first and second temperature sensors 40, 42 are separated by a distance of at least approximately 0.4 inch, more preferably by at least 0.5 inch, most preferably 0.5 inch. Further, the mounting pad sets 112a–112c are oriented so as to preferably position the heating element 110 between the first and second temperature sensors 40, 42. This preferred location results in the heating element 110 being optimally spaced from the housing 50 (FIG. 2) upon final assembly, thereby minimizing heat transfer from the heating element 110 to the housing 50 and thus to the second temperature sensor 42. Further, the circuitry trace 114a otherwise electrically connecting the first and second temperature sensors 40, 42 is preferably formed in the serpentine fashion illustrated in FIGS. 3 and 4. By providing additional surface area for the circuitry trace 114a, undesired heat transfer to the second temperature sensor 42 via the trace 114a is minimized.

An additional feature of the preferred circuitry assembly 52 is the locations of the mounting pad sets 112a–112c (and thus of the electrical components 54) relative to the trailing section 108. As made clear below, the trailing section 108 is specifically oriented relative to the housing 50 upon final assembly via the guide surface 90. Further, as previously described, the housing 50, and in particular the legs 74, provide a known orientation of the housing 50. Thus, the mounting pad sets 112a–112c are preferably arranged relative to the trailing section 108 as shown. When the substrate 100 is assembled to the housing 50, the temperature sensors 40, 42 will be at a predetermined position relative to the legs 74 such that the sensor 30 can consistently be mounted with the second, baseline sensor 42 physically above the first, heated sensor 40.

Returning to FIG. 2, the insulation material 56 is sized for placement within the internal compartment 92 defined by the lower section 62, and is configured to be conformable to a shape of the electrical components 54. For example, in one preferred embodiment, the insulation material 56 is Nomax. Regardless, upon final assembly, the electrical components 54 project into the insulation material 56, thereby protecting the electrical components 54 and reducing heat dissipating cross-talk between the sensors 40, 42.

Figure 5:
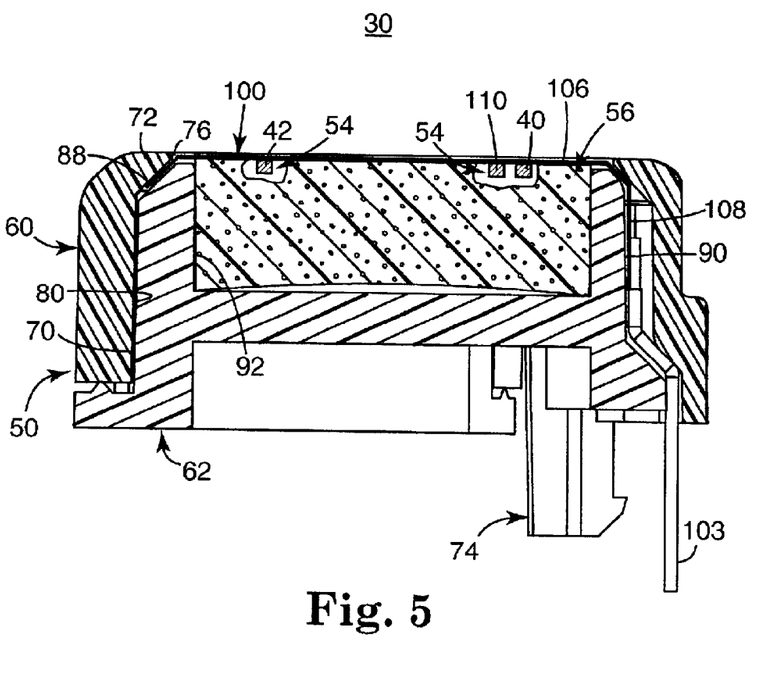
FIG. 5 is an enlarged, cross-sectional view of the airflow sensor of FIG. 2 upon final assembly.

The one preferred embodiment airflow sensor 30 is illustrated in FIG. 5 upon final assembly. The electrical components 54 are mounted to the flexible substrate 100. The insulation material 56 is mounted within the internal compartment 92. The substrate 100 is centrally located over the insulation material 56. In particular, the substrate 100 is positioned such that the electrical components 54 are embedded into the insulation material 56, whereas the back 106 faces the opening 76 formed in the upper section 60, such that the back 106 is exposed relative to the housing 50. The upper section 60 is mounted to the lower section 62, with the respective sidewalls 70, 80 preferably dictating a desired orientation of the two components 60, 62. In this regard, as the lower section 62 is forced upwardly (relative to the orientation of FIG. 5) toward the upper section 60, the substrate 100 is pinched between the lip 72 of the upper section 60 and the leading edge 88 of the lower section 62. As a result, the substrate 100 flexes upwardly (relative to the orientation of FIG. 5) into the opening 76, such that at least a portion of the substrate 100 is flush with the lip 72. Further, the electrical components 54 are embedded within the insulation material 56, and are aligned with the opening 76. The trailing section 108 of the substrate 100 is positioned between the respective sidewalls 70, 80, extending along the guide surface 90. With this construction, the wiring 103 is directed outwardly from the housing 50 as shown.

During use, the airflow sensor 30 is positioned within a desired duct (not shown). In one preferred embodiment and as previously described, the housing 50 is configured to dictate a desired orientation of the electrical components 54 relative to the legs 74, and the legs 74 are configured to dictate a known mounting orientation (relative to the duct wall and/or the system component to which the legs 74 are otherwise secured). Thus, in a preferred embodiment, the airflow sensor 30 is adapted to orientate the second, baseline sensor 42 physically below the heating element 110 and the first sensor 40 when mounted within the duct. Regardless, the heating element 110 is then activated, thereby heating the first temperature sensor 40. When forced airflow within the duct flows about the airflow sensor 30, it interacts or interfaces with the back 106 of the substrate 100 via the opening 76 in the housing 50. The interaction or interface, in turn, cools the first temperature sensor 40. As described in greater detail below, the processor 32 (FIG. 1), that is otherwise electrically connected to the temperature sensors 40, 42 via the wiring 103, interprets this change in temperature, via a comparison with the baseline temperature signal provided by the second temperature sensor via the wiring 103, to determine whether airflow is present.

The preferred airflow sensor 30 is highly compact, with the flexible circuitry substrate 100 being directly exposed to airflow. However, due to the highly smooth nature of the substrate 100, and in particular along the back 106, debris otherwise entrained within the airflow will not stick or otherwise accumulate along the flexible substrate 100. Further, the first and second temperature sensors 40, 42 are thermally isolated from one another via the insulation material 56 and the circuitry 102 (FIGS. 3 and 4) configuration previously described.

Returning to FIG. 1, the processor 32 is adapted to receive and interpret signals from the first and second temperature sensors 40, 42. In this regard, the processor 32 is preferably a micro-processor based computer including associated memory and associated input/output circuitry. Alternatively, a programmable logic controller (PLC) or other controller/processor or equivalent circuitry can be employed.

Regardless of an exact configuration of the airflow sensor 30, the processor 32 is adapted to receive, preferably continuously sample, signals from the first and second temperature sensors 40, 42, as well as to detect or predict the presence or absence of airflow based upon the received signals. In this regard, a variety of techniques are available for interpreting data from the temperature sensors 40, 42. In one preferred embodiment, however, the processor 32 is adapted to compare the temperatures found at the first and second temperature sensors 40, 42 and to generate a temperature sensor differential value based upon this comparison. The differential value is then compared to a threshold value to determine whether or not airflow is present.

Figure 6:
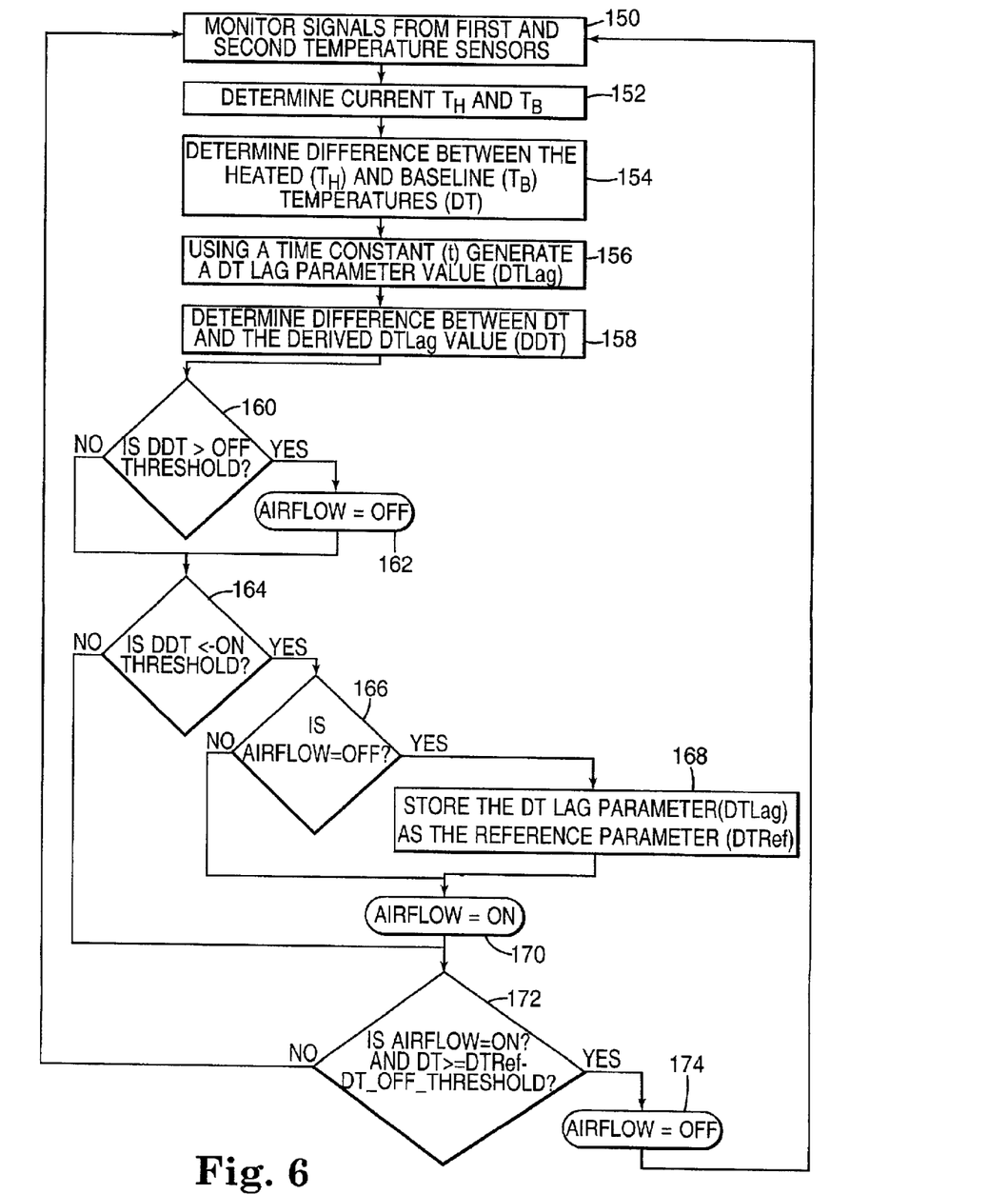
FIG. 6 is a flow diagram illustrating a preferred method of operating the airflow sensor system in accordance with the present invention.

With the above general constraints in mind, FIG. 6 illustrates one preferred method for detecting a presence or absence of airflow. At step 150, the processor 32 monitors signals from the first and second temperature sensors 40, 42. The received signals are converted to temperature readings at step 152. In particular, the processor 32 determines a temperature $T_H$ at the first, heated temperature sensor 40, and a temperature $T_B$ at the second, baseline temperature sensor 42.

The determined temperatures $T_H$, $T_B$ are then compared to one another, and a temperature differential value (DT) is generated at step 154. The temperature differential value DT is preferably determined as follows:

$$DT = T_H - T_B$$

The processor 32 could then simply compare DT with a threshold value to determine whether or not airflow is present. In general terms, it will be recalled that airflow will cool the first temperature sensor 40. As such, a relatively high DT value is indicative of an absence of airflow, whereas a relatively low DT value represents the presence of airflow. It is recognized, however, data obtained by the processor 32 is affected by part tolerances inherent to the airflow sensor 30, temperature gradients and power supply voltage variations, such that the simplistic approach of simply comparing DT to a threshold value will likely produce inaccurate results. The one preferred embodiment of the present invention overcomes these concerns by incorporating a first order lag filtering routine that accounts for the aforementioned affects on the heated and non-heated sensor 40, 42 readings. In particular, at step 156, a filtering operation is performed to generate a lag parameter (DTlag) based upon the temperature differential value DT and a filter time constant (t). One preferred filtering routine is represented by the following:

$$DTlag_{i+1} = DTlag_i + \frac{DT - DTlag_i}{\tau}$$

Where:
 DTlag$_{i+1}$=current DTlag value;
 DTlag$_i$=previous DTlag value;
 DT=current or instantaneous temperature differential ($T_H$-$T_B$); and
 t=filter time constant (seconds)

The above algorithm can be simplified by first multiplying both sides by t, resulting in the following:

$$DTlag_{i+1}*t = DTlag_i*t + (DT - DTlag_i)$$

In one preferred embodiment, t is equal to 32 seconds, such that the above equation can be further reduced as follows:

$$DTlag\_scale\_32\_current = DTlag\_scale\_32\_previous + (DT - DTlag)$$

The relationship between DTlag and DTlag_scale_32_current is as follows:

$$DTlag = \frac{DTlag\_scale\_32\_current}{\tau}$$

Finally, the difference between the instantaneous value of DT and DTlag can be determined by the processor 32 and designated as DDT (or temperature rate of change value):

$$DDT = DT - DTlag$$

With the DDT value in mind, the DTlag_scale_32_current value can alternatively be designated according to the following:

$$DTlag\_scale\_32\_current = DTlag\_scale\_32\_previous + DDT$$

In one preferred embodiment, the system and method of the present invention entails determining the values DT, DTlag, DDT, DTlag_scale_32_current each time readings are taken from the temperature sensors 40, 42, with the DTlag_scale_32_previous value being the previous DTlag_scale_32_current value. Alternatively, other methodologies can be employed to generate an appropriate DTlag value that, in turn, is used to generate the DDT value. Essentially, the DDT value is a function of the difference in the heated and unheated sensors with respect to a lag filter value.

With the above in mind, the preferred methodology continues to step 158 whereby a difference between DT and the derived DTlag values is determined. Once again, this difference is designated as DDT. The DDT value is then compared with one or more threshold values to determine whether airflow is present or not.

For example, at step 160, the difference (DDT) between the instantaneous value of DT and DTlag is compared to a threshold value indicative of a no airflow condition, and therefore referenced as being the "Off Threshold". In particular, the processor 32 determines if the DDT value is greater than the Off Threshold value. As a point of reference, the Off Threshold value is a positive number, and is preferably set at 8° F., although other values can be employed. If it is determined that the DDT value is greater than the Off Threshold value ("yes" at step 160), the processor 32 designates that airflow is "off" at step 162, with the methodology continuing to step 164 as described below.

Conversely, if the DDT value is less than or equal or to the Off Threshold value ("no" at step 160), the current airflow designation is left unchanged, and the methodology continues to step 164.

At step 164, the processor 32 compares the difference (DDT) between the instantaneous value of DT and DTlag to a threshold value indicative of the presence of airflow, and thus referred to as an "On Threshold" value. The On Threshold value is a negative number (or can be stored as a positive value, with the processor 32 logic comparing the DDT value to a negative of the stored On Threshold value) that reflects that the DDT value will become negative as airflow switches from off to on. With this in mind, a determination is made as to whether the DDT value is less than the On Threshold value at step 164. In one preferred embodiment, the On Threshold value is −4° F., although other values are acceptable.

Subsequent evaluation of the determined DDT value is provided below. It is noted, however, that the preferred absolute On Threshold value and Off Threshold value are not equal. This preferred approach addresses the possibility that an air handling system switching event whereby the fan/blower 28 transitions from a "high" operational state to a "low" operational state might cause the processor 32 to incorrectly designate airflow as being "off". By preferably employing a larger value for the Off Threshold value (that is otherwise indicative of airflow switching from on to off) than is used for the absolute On Threshold value (that is otherwise indicative of airflow switching from off to on) prevents a false off designation from occurring.

Regardless, if the processor 32 determines that the DDT value is greater than or equal to the On Threshold value (or negative of the On Threshold value when the On Threshold value is stored as a positive number) ("no" at step 164), the current airflow designation is left unchanged, and the preferred methodology continues to step 172 as described below. Effectively, where DDT is not less than the On Threshold, the processor 32 determines that the airflow has not transitioned from an off state to an on state, it being recalled that the evaluation preferred at previous steps 160 and 162 may have prompted the processor 32 to designate airflow as being off. Of course, the airflow designation could previously have been "on", and the evaluation at step 160 need not positively change this designation. Under these circumstances, if DDT is not less than the On Threshold, the airflow designation will remain "on" (i.e., the DDT value may not be indicative of an "off" to "on" event, but instead reflects airflow remaining on).

Conversely, if the processor 32 determines that the DDT value is less than the On Threshold value (or negative of the On Threshold value where the On Threshold value is stored as a positive number) ("yes" at step 164), the processor 32 will designate airflow as being "on" (at step 170). This designation will subsequently be confirmed based upon reference to stored reference parameter (DTRef) as described in greater detail below. In general terms, the DTRef value is initially set to a default that reflects the lowest temperature difference at zero airflow that would otherwise be expected. Preferably, however, the system and method of the present invention is adapted to calibrate itself, and in particular the DTRef value, relative to the environment within which the airflow sensor 30 is employed. With this in mind, at step 164, the processor 32 reviews the current airflow designation (e.g., prior to the positive "on" designation that will subsequently occur at step 170). If it is determined that the airflow designation is "on" (meaning that the airflow designation assigned by the processor 32 will remain "on" at step 170), it is assumed that there is no need to update the DTRef value as the air handling system 22 has not transitioned from an off state to an on state, but instead has simply remained on.

Otherwise, should the processor 32 determine that the current airflow designation is "off" ("yes" at step 166), the DTRef value is updated at step 168. Once again, a determination had previously been made at step 164 that the DDT value was less than the On Threshold value such that airflow is present. However, at step 166, the previous airflow designation assigned by the processor 32 was found to be "off". Thus, it is assumed that the air handling system 22 has now transitioned from off to on. As such, the current value of DTlag is a very good estimate of the steady state DT value associated when airflow transitions from off to on, and is stored as the DTRef value at step 168. All of the errors associated with part tolerances, power supply voltage and temperature gradients cause the DT value associated with flow transitioning from off to on to vary considerably. Thus, recording the current DTlag value as DTRef when the air handling system 22 is deemed to have transitioned from off to on is essentially airflow sensor specific, making it unnecessary to use high accuracy parts and regulated power.

Regardless of whether the DTRef value is updated with the current DTlag value, at step 170, the processor 32 designates that airflow is "on". The methodology then continues to step 172 whereby a final airflow designation evaluation is performed. In particular, the processor 32 first determines whether the current airflow designation is "on". Second, the processor 32 compares the instantaneous temperature difference (DT) with DTRef and a threshold value indicative of an expected temperature differential when airflow is off (referenced as "DT_off_threshold"). In particular, the processor 32 determines whether DT is greater than or equal to DTRef-DT_off_threshold. In preferred embodiment, DT_off_threshold is 5° F., although other values are acceptable. Essentially, the evaluation at step 172 addresses the situation whereby the above-described evaluation of the DDT value relative to the Off Threshold value and the On Threshold value might miss an event whereby the fan/blower 28 switches from a low fan speed to fully off. Step 172 attempts to correct this potential classification error by referring to the steady state value of DT and DTRef. In other words, it is possible that the DDT evaluation may overlook a transition because the Off Threshold value is too high. As such, step 172 essentially requires that where airflow is thought to be "on", and DT has risen above DTRef minus the DT_off_threshold, airflow is actually "off" ("yes" at step 172). Under these conditions, the processor 32 changes the airflow designation to "off" at step 170. Conversely, where the airflow designation is already "off" or where the current DT value is less than DTRef minus DT_off_threshold ("no" at step 712), the airflow designation is deemed appropriate. In either case, the methodology returns to step 150, and the airflow sensor evaluation repeated. Notably, and as previously described, a moving DTRef is preferably employed, whereby DTRef is updated at each airflow off to on transition at step 168, thereby correcting for potential part tolerance and/or supply voltage variations.

The above-described preferred system and method consistently provides relatively accurate airflow evaluations regardless of an exact airflow sensor design. Variations in part tolerances, airflow transients, and power supply voltages are compensated for on a continuous basis. When initially provided to a user, the processor 32 is preferably adapted to store initial or default values for DTRef, DTlag_ scale_32_current, and DTlag. Further, permanent values are preferably established for the On Threshold, Off Threshold, and DT_Off_Threshold values. Finally, in a preferred embodiment, the processor 32 is initialized with an "on" airflow designation.

By way of example, following installation, the heated temperature sensor 40 will be at room temperature. Therefore, the sensor readings obtained by the processor 32 are essentially meaningless until the heated temperature sensor 40 has reached an equilibrium temperature. Preferably, the air handling system is maintained in an "off" state during temperature sensor warm up. Once the heated temperature sensor 40 has reached an equilibrium temperature (e.g., on the order of 3–5 minutes), and with the air handling system 22, and in particular the fan/blower 28, maintained in an off state, the instantaneous temperature differential at the temperature sensors 40, 42 (DT) will reach steady state, such that DTlag (again representative of a first order lag in the temperature differences between the heated and unheated temperature sensors 40, 42) will equal DT. Subsequently, when the fan/blower 28 is activated, flow detection will occur that in turn will set DTRef at the DTlag value at the time of fan/blower activation (it being recalled that DTlag is at that point equal to DT). Effectively, then, the system and method has performed a self-calibration routine, with the now stored DTRef value being directly associated with the specific application.

Figure 7:
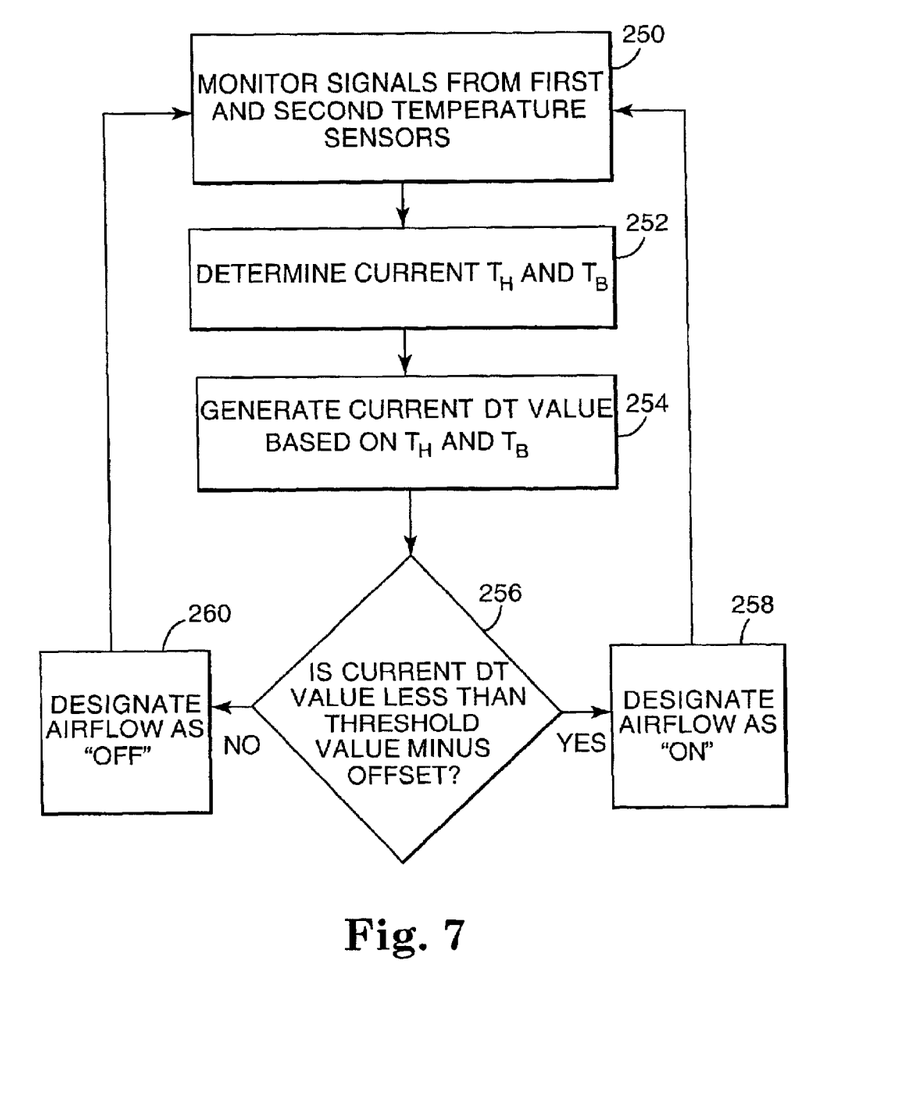
FIG. 7 is a flow diagram illustrating an alternative method of operating the airflow sensor system of the present invention.

The preferred system and method reflected by FIG. 6 is but one acceptable technique for determining the presence or absence of airflow. An alternative technique is illustrated in FIG. 7. Beginning at step 250, the processor 32 monitors signals from the first and second temperature sensors 40, 42. The received signals are converted to temperature readings at step 252, with $T_H$ again being in reference to a temperature at the first, heated temperature sensor 40, and $T_B$ being in reference to a temperature at the second baseline temperature sensor 42.

The determined temperatures $T_H$, $T_B$ are then compared to one another, and a temperature differential value (DT value) is generated at step 254. The DT value can simply be the actual, sensed difference in temperature between $T_H$ and $T_B$ (DTactual). Alternatively, the difference in temperatures can be adjusted through a first order lag smoothing filter routine (similar to that previously described with respect to FIG. 6) to account for inherent lag time associated with the temperature sensors 40, 42, producing a smoothed temperature differential value (DTs). One preferred filtering routine is represented by the following:

$$DTs_{i+1} = DTs_i + \frac{d\tau}{\tau}(DTs_i - DTactual)$$

Where:
$DTs_{i+1}$=current smoothed DT value;
$DTs_i$=previous smoothed DT value;
dt=sampling interval (seconds);
t=filter time constant (seconds); and
DTactual=current temperature differential ($T_H$-$T_B$).

The smoothed DTs value can be used as the DT value for purposes of comparison to the threshold value, or can be further adjusted to account for relatively slow dynamic response of the airflow sensor 30. For example, in one embodiment, a predictor technique for airflow detection is employed that utilizes rate of change of temperature as well as sensed temperature data. First, a rate of change of current DTactual with respect to time (dDTactual/dt) is necessary. In this regard, it will be recalled that the offset between DTactual and DTs is equal to the time constant of the filter (t) multiplied by the rate of change of DTactual. As such, the rate of change of DTactual with respect to time can be calculated as follows:

$$\frac{dDTactual}{dt} = \frac{(DTactual - DTs)}{\tau}$$

Where:

$\frac{dDT}{dt}$ = rate of change of DT actual with respect to time.

Additionally, it is known that the airflow sensor 30 has a first order lag response to a steady state temperature difference it will reach after any flow rate transient settles out. To account for this flow rate transient occurrence, a steady state temperature differential (DTsteady) can be factored in. In this regard, an airflow sensor time constant $t_S$ is employed, it being noted that the airflow sensor time constant $t_S$ is different from the filter time constant (t) used above in the smoothing filter routine. With this in mind, an equation for determining sensor response is as follows:

$$\frac{dDT}{dt} = \frac{1}{\tau_S}(DTsteady - DTactual)$$

As a point of reference, the time constant of the airflow sensor 30 previously described with respect to FIG. 2 has been measured experimentally to be, for example, in the range of 10–15 seconds. With the above equations in mind, the steady state temperature differential (DTsteady) that will be reached after the airflow transient passes can be determined as follows:

$$DTsteady = DTactual + \frac{\tau_S}{\tau}(DTactual - DTs)$$

The steady state temperature differential (Dtsteady) effectively provides a prediction of the temperature difference that will be reached after any transient dies out, and thus can be used as the current temperature differential value (current DT value) at step 254 in FIG. 7. Thus, for example, after airflow has been turned off (or turned on at a constant rate) for a long time, the smoothing filter output (DTs) will "catch up to" the actual differential measurement (DTactual) causing the second term on the right hand side of the above equation to go to zero. Then, the steady state estimate (DTsteady) will simply equal the current temperature differential reading (DTactual). Conversely, where airflow is initiated, the temperature difference will drop quickly. In this regard, the measured temperature differential DTactual will decrease more quickly than the smooth differential value (DTs), causing the second term on the right hand side of the above equation to become negative. That negative difference multiplied by the ratio of the time constants will subtract from the current temperature differential reading (DT).

As a result, the estimated steady state temperature differential (DTsteady) will drop quite quickly, and thus account for airflow transients via adjustment for rate of temperature change. Thus, in a most preferred embodiment, the DTsteady value is used as the current DT value for subsequent evaluation.

Regardless of how the current DT value is generated, at step 256, the processor 32 compares the current DT value with a threshold value. In particular, the processor 32 ascertains whether the current DT value is less than the threshold value minus a predetermined offset value. The threshold value is indicative of the expected temperature difference between the first and second temperature sensors 40, 42 when no airflow is present. In this regard, the threshold value is preferably adjusted over time to accommodate variations in the airflow sensor 30, the air handling system 22, etc. as described below, but alternatively can be a fixed value. The offset value is provided to account for sensitivity deviations in the airflow sensor 30, and is preferably in the range of 15–25° F., more preferably 20° F.

If the processor 32 determines that the current DT value is less than the threshold value minus the offset value ("yes" at step 256), the processor 32 then designates that airflow is "on" or otherwise occurring within the duct at step 258. Conversely, where the current DT value is greater than or equal to the threshold value minus the offset value ("no" at step 256), the processor 32 designates that the airflow is "off", or otherwise occurring within the duct at step 260. In either case, the methodology returns to step 250, whereby the processor 32 continues monitoring signals from the temperature sensors 40, 42.

With respect to the alternative method of FIG. 7, described, the processor 32 preferably utilizes a threshold value for determining whether the sensed temperatures are indicative of the presence or absence of airflow. In a preferred embodiment, the threshold value is initially set to a default value that reflects the lowest temperature difference at zero airflow that would otherwise be expected. Subsequently, the processor 32 continually monitors the measured temperature differential, and replaces the default value with the maximum temperature differential observed. When an even greater maximum temperature differential is later found, the threshold value is further updated with that new maximum. Preferably, the measured temperature differential is filtered to account for sensor lag time. Further, even if the sensed or filtered temperature differential value is greater than the current threshold value, other analyses are performed based upon certain operational parameters before the threshold temperature is replaced.

Figure 8:
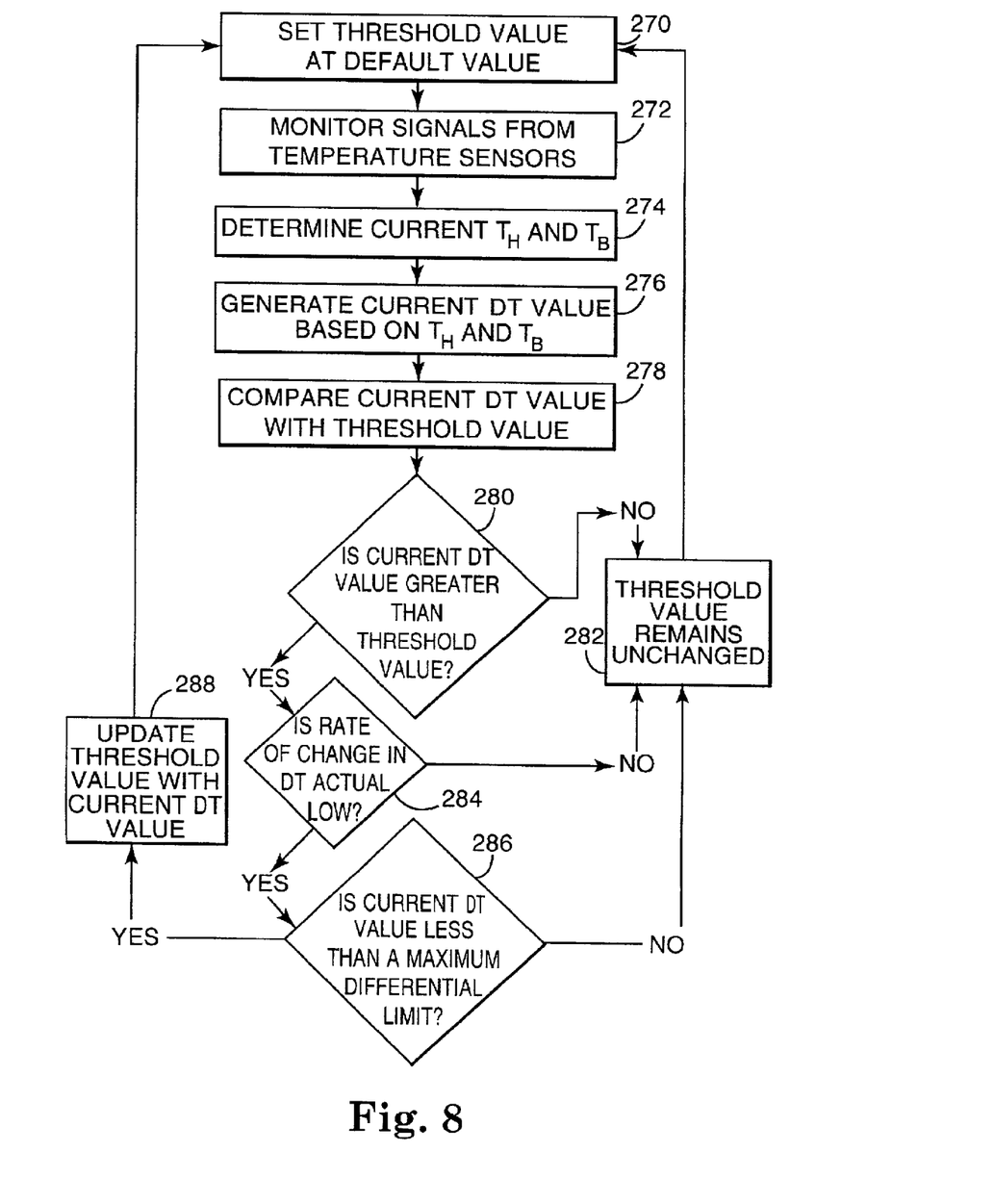
FIG. 8 is a flow diagram illustrating one preferred method of updating a threshold value used as part of the method of FIG. 7.

For example, FIG. 8 provides a flow diagram illustrating one method for updating the threshold value. Beginning at step 270 of FIG. 8, the threshold value is initially set at a default value. In other words, when initially provided to a user, the processor 32 is pre-programmed with a default value for the threshold value. Once again, the default value is preferably the lowest expected temperature differential between the first and second temperature sensors 40, 42 when no airflow is present, and thus is related to the particular configuration and components selected for the airflow sensor 30. Following installation, the processor 32 monitors, preferably continuously samples (on the order of one sample per second), signals from the first and second temperature sensors 40, 42 at step 272. At step 274, the temperature sensor signals are converted into temperature readings. Once again, the temperature reading associated with the first, heated sensor 40 is referenced as $T_H$, whereas the temperature reading associated with the second, baseline temperature sensor 42 is referenced as $T_B$. It will be noted that the methodology associated with the flow diagram in FIG. 8 repeats itself on a continuous basis. In other words, the temperatures $T_H$, $T_B$ are constantly being generated. To distinguish readings from individual samples, then, reference to the "current $T_H$ and $T_B$" is with reference to the most recent readings, and is distinguished from one or more previous readings.

At step 276, the processor 32 generates a current temperature differential value (DT value) based upon a comparison of the current temperatures $T_H$, $T_B$. In one embodiment, the current DT value is the measured temperature differential (DTactual) between the sensed temperatures $T_H$ and $T_B$. More preferably, the processor 32 adjusts DTactual for sensor lag via a smoothing filter routine. The smoothed estimate of DTactual is referenced as DTs, and is preferably generated as previously described with respect to FIG. 7. Notably, when the airflow sensor system 20 is first installed, DTs is initially set at the default value (and thus used as the value for $DTs_i$ during the initial smoothing filter routine). The resulting DTs value from the smoothing filter routine is then assigned as the current DT value.

With the current DT value in hand, the processor, at step 278, compares the current DT value with the threshold value. In particular, and as indicated at step 280, a determination is made as to whether the current DT value is greater than the threshold value. If the current DT value is less than or equal to the threshold value ("no" at step 280), the methodology continues to step 282, whereby the threshold value is left unchanged. In other words, because the current DT value is less than the threshold value, there is no need to "update" the threshold value. From step 282, the processor 32 returns to step 272 and repeats the above-described sequence. Conversely, where a determination is made that the current DT value is greater than the threshold value ("yes" at step 280), the processor 32 confirms that the rate of change in the temperature differential DTactual is not occurring too rapidly before replacing the threshold value. For example, a transient may occur within the airflow and/or the airflow sensor system 20 that gives rise to a drastic increase in the sensed temperature differential (DTactual) that does not reflect normal conditions. Thus, at step 282, a determination is made as to whether the rate of change in the sensed temperature differential DTactual is relatively low.

In one preferred embodiment, this determination is made by taking the absolute value of the difference between the sensed temperature differential and the smoothed temperature differential (DTactual–DTs), and then determining if this resultant value is greater than a predetermined rate limit. In one preferred embodiment, the rate limit is in the range of 10–20° F. If the rate of change of the temperature differential DTactual is above the rate limit ("no" at step 284), the current DT value is effectively designated as an outlier, such that the threshold value remains unchanged (at step 282).

Conversely, where the rate of change in the current DT value is acceptable ("yes" at step 284), the processor 32 confirms that the current DT value is less than a predetermined, maximum differential limit at step 186. This method step is employed to effectively reject an impossibly high temperature that should never occur, but might be the result of some unknown condition or failure mode. In a preferred embodiment, the maximum differential limit is in the range of 125–150° F. If the current DT value exceeds the limit ("no" at step 286), the method again returns to step 282 whereby the threshold value remains unchanged.

Conversely, where the current DT value is less than the limit ("yes" at step 286), the threshold value is updated with the current DT value at step 288. With this new or "updated" threshold value in mind, the methodology returns to step 272, and the above-described sequence repeated.

The above-described system and method for updating the threshold value otherwise used to indicate the presence or absence of airflow allows the airflow sensor system 20 to be used in a wide variety of operating environments, as well as with varying components/configurations of the airflow sensor 30 itself. In other words, the above-described methodology allows the processor 32 to adjust its airflow detection capabilities to satisfy the particular application's constraints, such as variations in mounting orientation of the airflow sensor 30 or power supply voltage variations. Additionally, the preferred method can effectively adjust the airflow detection routine for unexpected, but permanent variations in the capabilities associated with the first and second temperature sensors 40, 42. For example, it is possible that over time debris may accumulate on the airflow sensor 30, that may cause the first, heated sensor 40 to run hotter than expected. The system and method of the present invention accounts for this discrepancy by establishing a new threshold value that reflects actual operational conditions.

The airflow sensor, and related system and method of operation, provides a marked improvement over previous designs. The airflow sensor itself is highly inexpensive, and overcomes the debris accumulation concerns associated with other airflow sensors used in air handling system applications. Further, the related system and method preferably employs a lag filtering routine or rate of change variable when performing an airflow evaluation, and is thus insensitive to calibration errors, sensor drift, zero drift/adjust errors, which in previous devices, required expensive, high tolerance parts and/or expensive factory calibration of each sensor.

Although the present invention has been described with reference to preferred embodiments, worker's skilled in the art will recognize that changes can be made in form and detail without departing from the spirit and scope of the present invention.

What is claimed is:

1. An airflow sensor for detecting airflow within an air handling system, the airflow sensor comprising:
    a housing defining an internal compartment and a top face, the top face forming an opening;
    a flexible substrate having circuitry traces, a front, and a back, the substrate being disposed within the compartment such that the back is exposed relative to the opening in the top face; and
    electrical components electrically connected to the circuitry traces and extending from the front of the substrate opposite the opening, the electrical components including:
        a first, heated temperature sensor,
        a second, baseline temperature sensor,
        wherein the first and second temperature sensors are spaced from one another;
    wherein during use airflow interfaces with the back of the substrate to cool the first temperature sensor, the extent of cooling as compared to the second temperature sensor being indicative of airflow, and further wherein the airflow sensor is configured to limit accumulation of debris along the back of the flexible substrate.

2. The airflow sensor of claim 1, wherein the top face forms a lip otherwise defining the opening, the opening including an outer dimension less than that of the substrate such that upon final assembly, the back of the substrate abuts the lip.

3. The airflow sensor of claim 2, wherein the airflow sensor is adapted such that upon final assembly, at least a portion of the back of the substrate is substantially flush with the lip.

4. The airflow sensor of claim 1, wherein the housing is configured to be selectively secured to an ultraviolet air treatment device.

5. The airflow sensor of claim 4, wherein the housing includes a plurality of legs extending opposite the top face, the legs configured for attachment to the ultraviolet air treatment device.

6. The airflow sensor of claim 1, wherein the flexible substrate is a Kapton flexible circuit.

7. The airflow sensor of claim 1, wherein the back of the flexible substrate is substantially smooth.

8. The airflow sensor of claim 1, wherein the circuitry traces include a first trace electrically connecting the first and second temperature sensors to a common node.

9. The airflow sensor of claim 8, wherein the first trace extends in a serpentine fashion between the first and second temperature sensors.

10. The airflow sensor of claim 1, wherein upon final assembly, the first and second temperature sensors are aligned with the opening.

11. The airflow sensor of claim 1, wherein the first and second temperature sensors are spaced by approximately 0.5 inch.

12. The airflow sensor of claim 11, wherein the housing defines an outer diameter of approximately 1.2 inches.

13. The airflow sensor of claim 1, wherein the electrical components further include a heating element positioned in close proximity to the first temperature sensor for heating the first temperature sensor.

14. The airflow sensor of claim 13, wherein the heating element is positioned between the first and second temperature sensors.

15. The airflow sensor of claim 13, wherein the first and second temperature sensors are thermistors.

16. The airflow sensor of claim 1, further comprising:
    insulating material disposed within the compartment below the flexible substrate such that the electrical components are embedded within the insulating material.

17. An airflow sensor system for detecting airflow within an air handling system, the sensor system comprising:
    an airflow sensor including:
        a first, heated temperature sensor,
        a second, baseline temperature sensor; and
    a processor electrically connected to the temperature sensors, the processor adapted to:
        monitor signals from the temperature sensors,
        determine current temperature readings at the temperature sensors based upon the monitored signals,
        determine an airflow state within the air handling system based upon a difference between the determined current temperatures (DT) and a rate of change in DT.

18. The sensor system of claim 17, wherein the processor is further adapted to:
    generate a temperature rate of change value based upon a difference between DT and a lag temperature differential value; and
    compare the temperature rate of change value with at least one threshold value to detect the presence of airflow.

19. The airflow system of claim 18, wherein the processor is further adapted to generate the lag temperature differential value as a function of DT and a sensor lag parameter.

20. The sensor system of claim 19, wherein the processor is further adapted to:
   continuously update the current temperature readings; and
   continuously update DT, the temperature rate of change value, and the lag temperature differential value each time the current temperature readings are updated.

21. The sensor system of claim 20, wherein the updated temperature rate of change value is based upon the updated DT and the updated lag temperature differential value.

22. The sensor system of claim 21, wherein the updated lag temperature differential value is based upon a previous lag temperature differential value.

23. The sensor system of claim 18, wherein the processor is further adapted to compare the temperature rate of change value with a first threshold value to designate that airflow is not present and with a second threshold value to designate that airflow is present.

24. The sensor system of claim 23, wherein the first threshold value is a positive number, whereby if the temperature rate of change value is greater than the first threshold value, the processor is adapted to designate that airflow is not present.

25. The sensor system of claim 23, wherein the second threshold value is a negative number, whereby if the temperature rate of change value is less than the second threshold value, the processor is adapted to designate that airflow is present.

26. The sensor system of claim 18, wherein the processor is further adapted to designate that airflow is not present based upon a comparison of DT with a reference parameter.

27. The sensor system of claim 26, wherein the reference parameter is indicative of operational conditions when the air handling system transitions from an airflow off state to an airflow on state.

28. The sensor system of claim 27, wherein the processor is further adapted to update the reference parameter with a current value upon determining that the air handling system has transitioned from an airflow off state to an airflow on state.

29. The sensor system of claim 17, wherein the processor is farther adapted to generate a current temperature differential value based upon a difference between the determined current temperatures and to designate that airflow is present when the current temperature differential value is less than a threshold value.

30. The sensor system of claim 17, wherein the sensor further includes:
   a housing defining an internal compartment and a top face, the top face forming an opening; and
   a flexible substrate having at least one circuitry trace, a front, and a back, the flexible substrate being disposed within the compartment such that the back is exposed relative to the opening in the top face;
   wherein the first and second temperature sensors are electrically connected to the circuitry trace and positioned to extend from the front of the substrate opposite the opening.

31. The sensor system of claim 17, wherein the processor is further adapted to control an ultraviolet air treatment device based upon the determined airflow state.

32. A method for detecting airflow within an air handling system including ductwork, the method including:
   positioning an airflow sensor within the ductwork, the airflow sensor including a first, heated temperature sensor and a second, baseline temperature sensor;
   monitoring signals from the temperature sensors;
   determining current temperature readings at the respective temperature sensors based upon the monitored signals; and
   determining an airflow state within the air handling system based upon a difference between the determined current temperature readings (DT) and a rate of change in DT.

33. The method of claim 32, further comprising:
   generating a temperature rate of change value based upon a difference between DT and a lag temperature differential value;
   wherein determining the presence of airflow includes comparing the temperature rate of change value with at least one threshold value.

34. The method of claim 33, further comprising:
   generating the lag temperature differential value as a function of DT and a sensor lag parameter.

35. The method of claim 33, further comprising:
   a. receiving updated current temperature readings;
   b. generating an updated DT value;
   c. generating an updated lag temperature differential value; and
   d. generating an updated temperature rate of change value.

36. The method of claim 35, wherein the updated lag temperature differential value is based upon a previous lag temperature differential value.

37. The method of claim 36, wherein the updated lag temperature differential value is further based upon the updated temperature rate of change value.

38. The method of claim 33, wherein determining an airflow state further includes:
   comparing the temperature rate of change value with a first threshold value to determine if airflow is not present;
   comparing the temperature rate of change value with a second threshold value to determine if airflow is present.

39. The method of claim 38, wherein the first threshold value is a positive number, and further wherein determining the airflow state further includes:
   designating airflow as being off when the temperature rate of change value is less than the first threshold value.

40. The method of claim 38, wherein the second threshold value is a negative number, and further wherein determining the airflow state further includes:
   designating that airflow is on when the temperature rate of change value is less than the second threshold value.

41. The method of claim 33, wherein determining the airflow state further includes:
   comparing DT with a reference parameter.

42. The method of claim 41, wherein the reference parameter is indicative of operational conditions when the air handling system transitions from an airflow off state to an airflow on state.

43. The method of claim 42, further comprising:
   updating the reference parameter with a current value upon determining that the air handling system has transitioned from an airflow off state to an airflow on state.

44. The method of claim 32, wherein determining the airflow state includes:

generating a current temperature differential value based upon a difference between the determined current temperature readings; and comparing the current temperature differential value with a threshold value;

wherein airflow is designated as being present as a function of whether the current temperature differential value is less than the threshold value.

45. The method of claim 32, further comprising providing an airflow sensor including:

a housing defining an internal compartment and a top face, the top face forming an opening; and a flexible substrate having at least one circuitry trace, a front, and a back, the flexible substrate being disposed within the compartment such that the back is exposed relative to the opening in the top face;

wherein the first and second temperature sensors are electrically connected to the circuitry trace and positioned to extend from the front of the substrate opposite the opening.

46. The method of claim 32, further comprising:

signaling the determined airflow state to an ultraviolet air treatment device.

* * * * *